United States Patent
Valys et al.

(10) Patent No.: US 6,598,220 B1
(45) Date of Patent: Jul. 22, 2003

(54) SYSTEM AND METHOD FOR ALLOWING REGISTERABLE RUNTIME MODIFICATION OF OBJECT BEHAVIORS

(75) Inventors: David T. Valys, Austin, TX (US); James P. McGlothlin, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/466,564

(22) Filed: Dec. 17, 1999

(51) Int. Cl.[7] ............................................... G06F 9/44
(52) U.S. Cl. ..................... 717/116; 717/108; 717/116; 707/703
(58) Field of Search ................................ 717/116, 120, 717/147, 165, 108, 101, 127, 203, 511, 513

(56) References Cited

U.S. PATENT DOCUMENTS

| | | | | |
|---|---|---|---|---|
| 5,187,786 A | | 2/1993 | Densmore et al. ........... 395/600 |
| 5,313,633 A | | 5/1994 | Tomita et al. ............... 395/700 |
| 5,737,606 A | * | 4/1998 | Cummins .................... 709/315 |
| 5,760,773 A | * | 6/1998 | Berman et al. .............. 345/808 |
| 5,812,390 A | | 9/1998 | Merkin ........................ 364/131 |
| 5,848,273 A | * | 12/1998 | Fontana et al. ............. 717/108 |
| 5,872,973 A | * | 2/1999 | Mitchell et al. ............. 709/332 |
| 5,913,063 A | | 6/1999 | McGurrin et al. ........... 395/702 |
| 6,104,874 A | * | 8/2000 | Branson et al. ............. 717/108 |
| 6,178,550 B1 | * | 1/2001 | Pearce ......................... 717/100 |
| 6,182,277 B1 | * | 1/2001 | DeGroot et al. ............ 717/115 |
| 6,262,726 B1 | * | 7/2001 | Stedman et al. ............ 345/333 |
| 6,263,492 B1 | * | 7/2001 | Fraley et al. ................ 717/107 |
| 6,263,498 B1 | * | 7/2001 | Alcorn et al. ............... 717/110 |
| 6,266,708 B1 | * | 7/2001 | Austvold et al. ........... 709/315 |
| 6,275,979 B1 | * | 8/2001 | Graser et al. ............... 717/100 |
| 6,305,009 B1 | * | 10/2001 | Goor .......................... 717/116 |
| 6,351,778 B1 | * | 2/2002 | Orton et al. ................. 709/310 |
| 6,393,559 B1 | | 5/2002 | Alexander ................... 713/2 |
| 6,405,263 B1 | * | 6/2002 | Conner et al. .............. 709/315 |
| 6,425,078 B1 | * | 7/2002 | Smith et al. ................. 713/1 |
| 6,480,856 B1 | * | 11/2002 | McDonald et al. ......... 707/100 |

FOREIGN PATENT DOCUMENTS

JP 7191849 A 7/1995 ............. G06F/9/44

OTHER PUBLICATIONS

Ostermann et al., "Object orientd composition untangled", ACM OOPSLA, pp 283–298, 2001.*
Clifton et al., MultiJava: Modular open classes and symmetric multiple dispatch for Java, ACM OOPSLA, pp 130–145, 2000.*
Meyrowitz, Intermedia: The architecture and construction of an object oriented hypermedia system and applications framework, ACM OOPSLA, pp 186–201, 1986.*
Liu et al., The building blocks for apecifing communication behavior of complex objects: An activity driven apprach, ACM Trans. on Database System, vol. 21, No. 2, pp 157–207, 1996.*
U.S. Pending patent application Ser. No. 08/380,985 entitled "Mechanism for Optimizing Location of Machine–Dependent Code" by John J. Pearce; Dell USA, L.P., filed Jan. 31, 1995.

* cited by examiner

Primary Examiner—Anil Khatri
(74) Attorney, Agent, or Firm—Baker Botts L.L.P.

(57) ABSTRACT

A system and method for allowing registerable runtime modification of object behaviors are disclosed. The disclosed embodiments provide an easily implemented and flexible approach for handling correct behavior resolution in an object-oriented program. A system incorporating teachings of the present disclosure may include an object-oriented program having an override mechanism capable of providing behavior resolution in response to a call for a registered method. In some embodiments, a computer readable medium may be storing the program and a computing platform may be communicatively coupled to the computer readable medium. In operation, an application operable to execute on the computing platform may call the registered method and the override mechanism may cause the execution of an appropriate behavior in response to the call.

19 Claims, 2 Drawing Sheets

SYSTEM AND METHOD FOR ALLOWING REGISTERABLE RUNTIME MODIFICATION OF OBJECT BEHAVIORS

TECHNICAL FIELD

The present invention relates in general to the field of computer programming and, more particularly, to a system and method for allowing registerable runtime modification of object behaviors.

BACKGROUND

Object-oriented programming has become a powerful tool for computer programmers. An object-oriented program is one that has as its basic foundation a set of building blocks called objects. These objects often act as a representation or abstraction of a physical element or a logical concept. An object may be defined by data that represents specific attributes or properties of the object, and a set of functions or methods that can be performed on or by the object. Typically, each object can receive messages instructing it to perform a particular function, or send such messages to other objects. In practice, objects are frequently reusable and may be called by a variety of different application programs.

In general, a called object will perform a specific and predefined behavior in response to a certain call. It is often desirable for a given object to perform different behaviors in response to a call based upon information known only at runtime. For example, an object representing a file may receive a save call. In one circumstance, the save call may cause the object to stream its data in binary format to a file, to construct a header, and to set attributes. However, at runtime, it may be determined that the file is a text file and instead of using a binary format a UNICODE format should be used.

Runtime modifications of object behavior such as the situation described above tend to create difficulties for object-oriented programs. Conventional solutions for these difficulties include polymorphism, bridge patterns, and en mass delegation.

Unfortunately, each of these conventional approaches has significant limitations. For example, in a complex system, polymorphism can lead to a problem known as "proliferation of classes". While bridge patterns and en mass delegation may help limit the "proliferation of classes" problem, both of these techniques tend to be difficult and tedious to implement and are often unable to handle multiple shared implementations.

SUMMARY

In accordance with the present disclosure, a system and method for allowing registerable runtime modification of object behaviors are disclosed that provide significant advantages over prior developed techniques. The disclosed embodiments provide an easily implemented and flexible approach for handling correct behavior resolution at runtime.

According to one aspect of the present disclosure, a system incorporating teachings of the present disclosure may include an application with at least one override mechanism capable of providing behavior resolution in response to a call for a specific behavior. In some embodiments, a computer readable medium may be storing the application and a computing platform may be communicatively coupled to the computer readable medium. In operation, an executable may generate a call for the specific behavior and the override mechanism may cause the execution of an appropriate behavior in response to the call. In one embodiment, the application containing the override mechanism may include the executable that generates the call. In another embodiment, the executable that generates the call may be outside an application containing the override mechanism.

According to another aspect of the present disclosure, a method for allowing registerable runtime modification of behaviors may include providing a class within an object-oriented program with a reference to an override mechanism. The method may also include registering an overrideable method with the override mechanism.

Classes providing implementation of overrideable methods may include, for example, logging and debugging classes, special action classes, security classes, information gathering classes, notification classes, and installation dependency classes. In preferred embodiments, a registered overrideable method will be stubbed to call the override mechanism for behavior resolution when the registered overrideable method receives a call. In one embodiment, the override mechanism may cause the execution of a first behavior if a first situation exists at runtime and the execution of a second behavior if a second situation exists at runtime.

The disclosed system and method provide several technical advantages over conventional approaches for handling runtime modification of object behavior. For example, creating an override mechanism that accepts registration of an overrideable method minimizes class proliferation problems. With the disclosed system and method, new chains of classes and subclasses may not need to be created to allow a class to have flexibility at runtime.

In addition, unlike bridge patterns and en mass delegation, implementation of the disclosed system and method may be relatively simple. An overrideable method may be registered with the override mechanism and stubbed to call the override mechanism when the overrideable method is called. In addition, the disclosed system and method may be used to handle multiple shared implementations of a single registered method.

Other technical advantages will be apparent to those of ordinary skill in the art in view of the following specification, claims, and drawings.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

Figure 1:
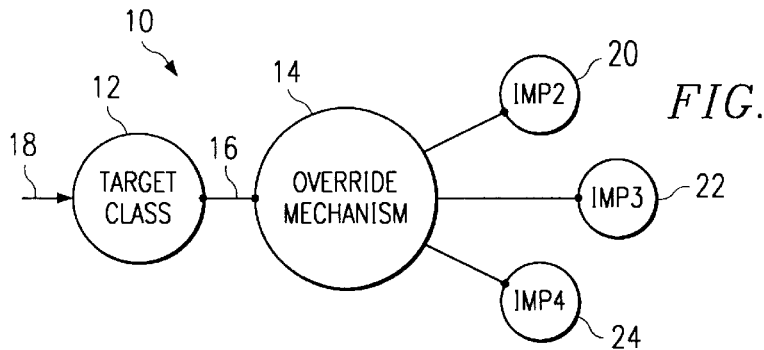
FIG. 1 depicts a schematic representation of a system incorporating teachings of the present disclosure.

FIG. 1 depicts a schematic representation of a system 10 incorporating teachings of the present disclosure. The schematic of FIG. 1 may represent items within an object-oriented program environment. The schematic may be part of an object-oriented application or program operating on a computer system. The computer system may, for example, include a monitor, a keyboard, a computer readable medium storing the object-oriented application, and a computing platform. The computing platform could be made up of several different components. For example, the platform may include a motherboard, a microprocessor, or any component capable of executing the object-oriented application.

Within the object-oriented application, classes and subclasses may be used to group and define objects, which may be referred to as instances of classes. Objects often share common characteristics such as the same attributes and/or methods. Because subclasses include the characteristics of a parent class but add additional attributes and/or methods, subclasses allow an object-oriented hierarchy to represent more and more specific elements. The inclusion of the characteristics of a parent class into a subclass is often referred to as inheritance. Inheritance allows an object to take on characteristics and methods from its class hierarchy. As a general rule, subclasses inherent all of the attributes and/or methods of the parent class. However, on occasion, a subclass may be given the ability to overload or redefine the behavior of a method that the subclass has inherited from a parent class.

An actual, usable instance of a class is commonly referred to as an object. An object combines the attributes and methods of a class with actual data for a specific item such that the object represents that specific item. Typically, an object is what programmers use and manipulate in an application or a program.

Objects communicate using messages. Thus, if one object needs to know the status of another object, the first object can send a message to the other object. The other object may then respond with status information. In practical terms, "sending a message" may be the equivalent of calling a method that belongs to the other object.

A general benefit of object-oriented programming is the facilitation of code reuse. Classes achieve reusability by encapsulating attributes and methods. The encapsulation helps hide implementation. Thus, when a programmer writes a program to use an object of a class, all that the programmer may see is the methods that are defined for the object in its class.

If a given object requires flexibility at runtime, a programmer initially creating the object may implement system 10 into an object-oriented application to render the object and the object-oriented application more useable to subsequent programmers, for example, programmers writing other applications, programs, or executables that may call the object being created. System 10 allows an object to be flexible in its response to calls while keeping the interface and identity of the object the same.

For example, as depicted, a target object 12 has a reference 16 to an override mechanism 14. In some embodiments, target object 12 may also have one or more registered methods stubbed to pass a respective method call along reference 16 to override mechanism 14 when and if target object 12 receives an incoming call 18 for the registered method or methods.

In some applications, target object 12 may require flexibility at runtime. For example, target object 12 may need to respond to incoming call 18 by executing a first behavior if a first situation exists at runtime or, alternatively, by executing a second behavior if a second situation exists at runtime. These various behaviors may, for example, be represented by implementations 20, 22, and 24.

In operation, target object 12 of system 10 may receive incoming call 18 for a registered method. Target object 12 may be stubbed to call override mechanism 14 along reference 16 in response to receiving incoming call 18. After receiving the call, override mechanism 14 may call a specific implementation object or through a collection of registered implementation objects. The use of override mechanism 14 helps resolve many common problems associated with polymorphism, bridge patterns, and en mass delegation.

With polymorphism, programmers creating an object may derive a new class from a base class. If a called method is declared virtual in the base class, then the new class, if a subclass, can overload the called method. At runtime, the application may instantiate a nonabstract base class object or new subclass objects. When receiving a method call on the instantiated object, the instantiated object will execute appropriate behaviors based on inheritance. Additional flexibility may also be added using multiple inheritance.

Unfortunately, in complex computer and software systems, proliferation of classes may arise. In addition there may be permanent binding between the abstraction of the class and the implementation of the class and extensibility may be hampered. Moreover, changes in implementation may affect clients and private implementation details may be exposed to clients.

With bridge patterns, which may sometimes be referred to as handle/body, a second contained class held by reference to implement the actual behaviors for the first class may be used. While this helps reduce proliferation of class problems and improves extensibility, implementation can be tedious. Moreover, bridge patterns tend to have difficulties handling multiple shared implementations. Because en masse delegation is basically a more extensive form of a bridge pattern, en masse delegation faces similar problems, which may be at least partially avoided by using system 10.

When a developer of an application suspects that a class may have instances that require flexibility, the developer may choose to incorporate system 10 into the application being developed. As such, the developer may create a class that allows, for example, certain methods to be overridden. In practice, methods that are overrideable may be explicitly registered through override mechanism 14's registration interface. Once registered, override mechanism 14 may determine what happens in response to a call for the registered overrideable method.

The developer may allow and/or disallow methods to be overridden on a method by method basis. If a method is overrideable, several "types" of override implementations may be appropriate. For example, override implementations may include "back to the target" implementations. In this situation, when a registered method of a target object is called, the target may forward the call to override mechanism 14, which may in turn forward the call back to the target object. At this point, the target object may respond to the call.

Override implementations may also include "to an external object" implementations. For example, in FIG. 1, when a registered method of target object 12 receives incoming call 18, target object 12 may forward the call to override mechanism 14, which may in turn call a registered implementation object or a multiplicity of registered implementation objects.

Override implementations may also be registered as "NOOP" or no operation. For example, when a registered method of a target object is called, the target may forward the call to override mechanism 14, which may, in fact, perform no operation in response to the forwarded call.

Override implementations may also include a mixture of external, back to target, and NOOP implementations. As such, when a registered method of target object 12 receives incoming call 18, target object 12 may forward the call to override mechanism 14, which may in turn call a multiplicity of registered implementation objects that may include, for example, external implementations, back to target implementations, and/or NOOP implementations.

As mentioned above, override mechanism 14 may be designed to allow restrictions to be placed on which override implementations may be registered on a method by method basis. For example, override mechanism 14 could disallow the overriding of main implementations while allowing before and after overrides. As such, a user trying to register a disallowed override implementation with override mechanism 14 may fail even though an overrideable method of target object 12 had been registered with override mechanism 14.

Figure 2:
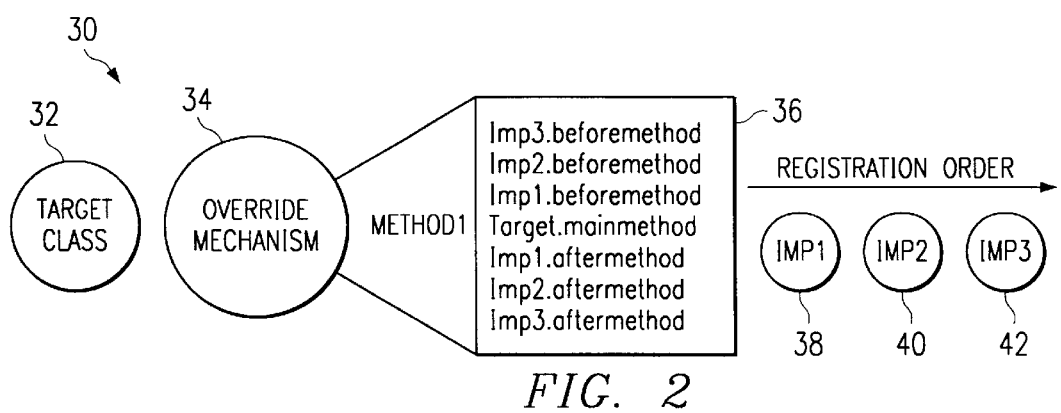
FIG. 2 depicts a schematic representation of an embodiment of a system incorporating teachings of the present disclosure including an execution order with no main override.
Figure 3:
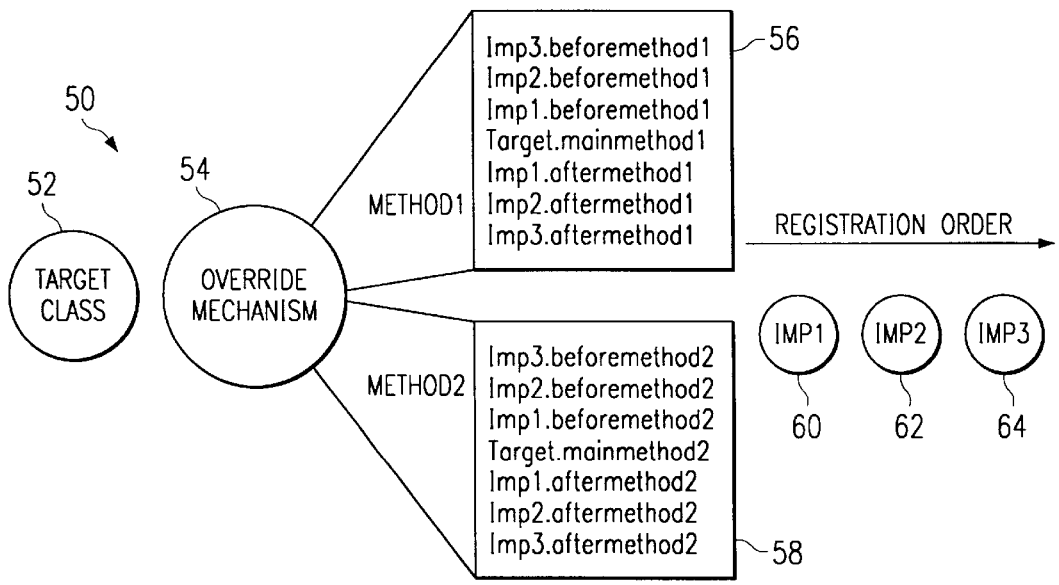
FIG. 3 depicts a schematic representation of an embodiment of a system incorporating teachings of the present disclosure including an execution order with two overridden methods and a main override.
Figure 4:
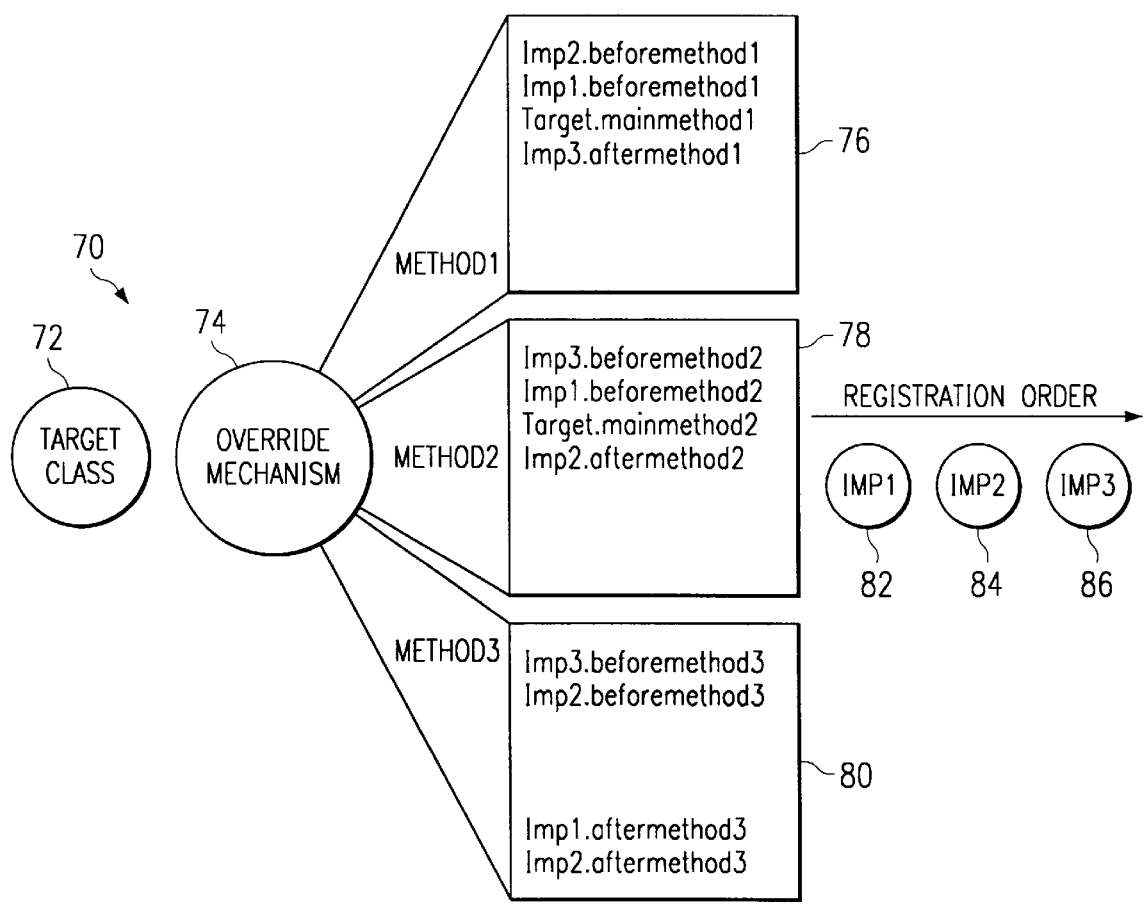
FIG. 4 depicts a schematic representation of an embodiment of a system incorporating teachings of the present disclosure including an execution order with three overridden methods and a main override using a mixture of target methods among the overriding classes.

In some embodiments, override mechanism 14 may allow registration of multiple methods that relate to actions or behaviors to be taken before and after the method actually being called. FIGS. 2–4 depict before and after registration schemes that incorporate teachings of the present disclosure and allow for avoidance of class proliferation problems.

FIG. 2 depicts a schematic representation of system 30, which may include an execution order 36 with no main override. In FIG. 2, target object 32 may have a method, "Target.mainmethod", registered with override mechanism 34. When and if target object 32 receives a call for "Target.mainmethod", target class 32 may call override mechanism 34, which may call through execution order 36.

As depicted by execution order 36, calling a single registered overrideable method of a target object may cause execution of before methods, a main method, and after methods. These methods may relate to behaviors or actions. The order in which override implementations are executed may relate to the order in which the override implementations were registered. The order of execution may follow any number of schemes. As depicted in FIG. 2, before methods are executed in a reverse order relative to the order of registration, while after methods are executed in the order in which they were registered. For example, override implementation 42 may be executed as a before method before implementations 40 and 38 even though override implementation 42 was registered after implementations 40 and 38.

Though FIG. 2 depicts a target object with only one registered overrideable method, some objects may have more than one registered overrideable method. FIG. 3 depicts a schematic representation of a system 50 incorporating teachings of the present disclosure including execution orders 56 and 58 for two registered overrideable methods, method1 and method2, respectively. In FIG. 3, target object 52 may call override mechanism 54 when and if target object 52 receives a call for method1 or method2, which are both registered with override mechanism 54. Review of execution orders 56 and 58 reveal a mixture of before, after and target methods made up of main methods and override implementations 60, 62 and 64.

When target object 54 receives a call and forwards it to override mechanism 54, override mechanism 54 may call through an appropriate execution order. For example, if method1 is called, override mechanism 54 may call through execution order 56. If method2 is called, override mechanism 54 may call through execution order 58.

In some embodiments, related methods may be registered around a main implementation. For example, the override methods of execution order 56 may be functionally dependent on each other. Within execution order 56, a "beforemethod" might grant write access to a file, while an "aftermethod" might restore the files access to the previous state. This is not to say, however, that a method that runs before and a method that runs after must be directly functionally related to each other or to a main method, if one is present.

FIG. 4 depicts a system 70 incorporating teachings of the present disclosure. System 70 includes a target object 72 that has registered three overrideable methods with an override mechanism 74. Each of the three registered overrideable methods has an override implementation containing a series of methods to be performed when the registered overrideable methods are called. The override implementations are contained in execution orders 76, 78, and 80. Review of execution orders 76, 78, and 80 reveal a mixture of before, after and target methods made up of main methods and override implementations 82, 84 and 86.

Although the present invention has been described in detail, it should be understood that various changes, substitutions and alterations can be made thereto without departing from the spirit and scope of the invention as defined by the appended claims.

What is claimed is:

1. A computer system allowing runtime modification of a called behavior, comprising:

a computing platform communicatively coupled to a computer readable medium;

the computer readable medium storing an application;

the application including at least one override mechanism operable to provide behavior resolution in response to a call for a behavior; and the override mechanism operable to provide the behavior resolution by calling at least one of a before method and an after method registered with the override mechanism as override methods.

2. The computer system of claim 1, further comprising:

a monitor communicatively coupled to the computing platform; and a keyboard communicatively coupled to the computing platform.

3. The computer system of claim 1, further comprising an executable operable to generate the call for the behavior.

4. The computer system of claim 3, wherein the application comprises the executable.

5. The computer system of claim 1, wherein the application comprises an object-oriented program.

6. The computer system of claim 5, further comprising a registration interface associated with the override mechanism for registering an overrideable method with the override mechanism.

7. The computer system of claim 6, further comprising:

a second registration interface associated with the override mechanism, the second registration interface operable to allow registration of override implementations with the override mechanism; and wherein one or more of the override implementations includes before methods and after methods.

8. The computer system of claim 7, wherein the override mechanism is operable to restrict non-registerable override implementations from registration through the second registration interface.

9. The computer system of claim 7, wherein the second registration interface is operable to accept registration of override implementations from parent classes and subclasses.

10. A system for allowing runtime modification of object behavior in an object-oriented program operating on a computer system, comprising:

an object requiring flexibility at runtime, the object containing at least one method registered with an override mechanism;

the at least one method stubbed to call the override mechanism for behavior resolution if called; and the override mechanism operable to ensure execution of an appropriate behavior in response to a call for the at least one registered method by calling at least one of a before method and an after method registered with the override mechanism as override methods for the at least one registered method.

11. The system of claim 10, further comprising an executable operable to generate the call.

12. The system of claim 10, wherein the object-oriented program comprises an executable operable to generate the call.

13. A method for allowing registerable runtime modification of object behaviors in an object-oriented program for a computer system, comprising:

providing an override mechanism within the object-oriented program;

registering at least one overrideable method associated with an object with the override mechanism;

setting the at least one overrideable method to call the override mechanism for behavior resolution if the at least one overrideable method receives a call;

registering an override implementation for the at least one overrideable method with the override mechanism, wherein the override implementation includes at least one of a before method and an after method; and the override mechanism providing the behavior resolution by calling at least one of the before method and the after method from the override implementation.

14. The method of claim 13, wherein the at least one overrideable method executes a first behavior if a first situation exists at runtime and executes a second behavior if a second situation exists at runtime.

15. The method of claim 13, further comprising registering a second overrideable method associated with the object with the override mechanism.

16. The method of claim 13, further comprising calling the at least one overrideable method.

17. A method for allowing registerable runtime modification of object behaviors in a computer system, comprising:

constructing an object operable to respond to a call with a first behavior if a first situation exists at runtime and further operable to respond to the call with a second behavior if a second situation exists at runtime;

implementing an override mechanism to handle correct behavior resolution when the object receives the call;

accepting registration of an override implementation with the override mechanism, wherein the override implementation includes at least one of a before method and an after method; and wherein the override mechanism provides the correct behavior resolution by automatically calling at least one of the before method and the after method from the override implementation when the object receives the call.

18. The method of claim 17, further comprising:

registering at least one method of the object with the override mechanism; and stubbing the at least one method to call the override mechanism for behavior resolution if the at least one method is called.

19. The method of claim 17, further comprising providing a registration interface on the override mechanism to allow registering of the at least one method with the override mechanism.

* * * * *